No. 710,142. Patented Sept. 30, 1902.
G. R. DAVIDSON.
BEAN CLEANING MACHINE.
(Application filed Nov. 14, 1901.)
(No Model.) 2 Sheets—Sheet 1.
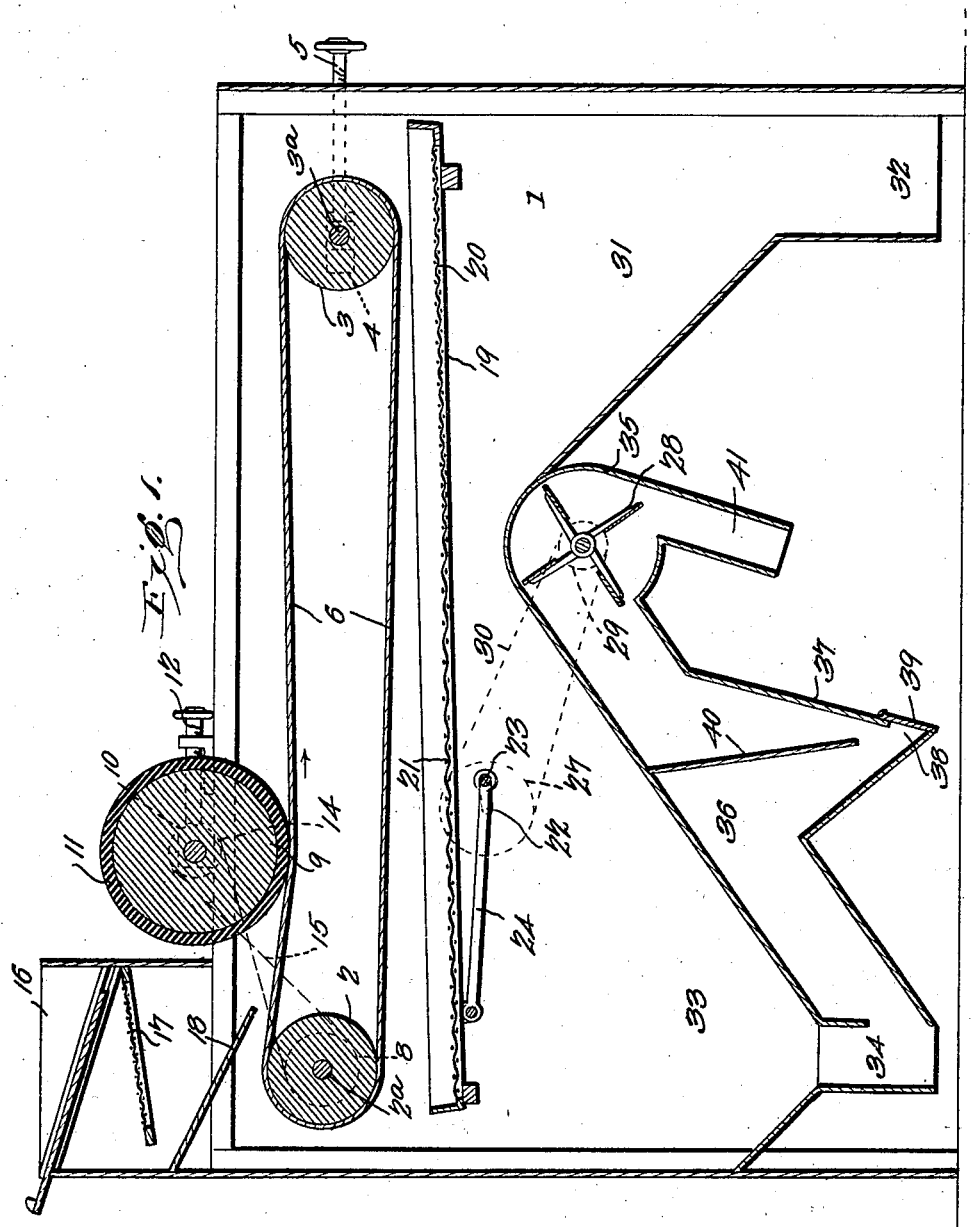

No. 710,142.　　　　　　　　　　　　　　　Patented Sept. 30, 1902.
G. R. DAVIDSON.
BEAN CLEANING MACHINE.
(Application filed Nov. 14, 1901.)
(No Model.)　　　　　　　　　　　　　　　　　　2 Sheets—Sheet 2.
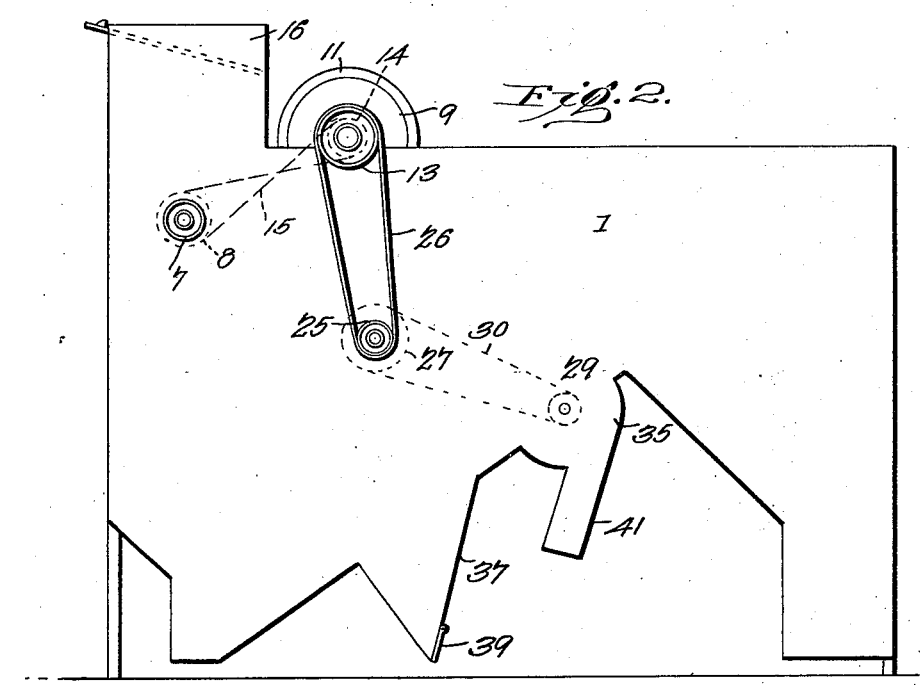
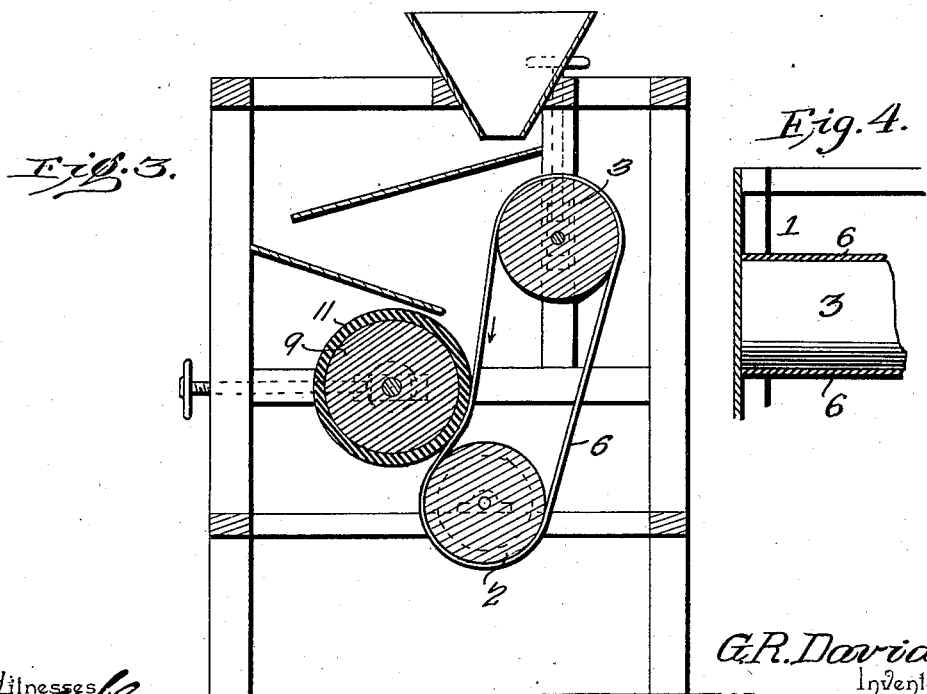

UNITED STATES PATENT OFFICE.

GEORGE R. DAVIDSON, OF LENOX, MICHIGAN.

BEAN-CLEANING MACHINE.

SPECIFICATION forming part of Letters Patent No. 710,142, dated September 30, 1902.

Application filed November 14, 1901. Serial No. 82,302. (No model.)

*To all whom it may concern:*

Be it known that I, GEORGE R. DAVIDSON, a citizen of the United States, residing at Lenox, in the county of Macomb and State of Michigan, have invented a new and useful Bean-Cleaning Machine, of which the following is a specification.

My invention is an improved bean-cleaning machine adapted for separating beans from earthy particles and other impurities; and it consists in the peculiar construction and combination of devices hereinafter fully set forth and claimed.

In the accompanying drawings, Figure 1 is a vertical longitudinal sectional view of a bean-cleaning machine embodying my improvements. Fig. 2 is a side elevation of the same. Fig. 3 is a vertical sectional view of a modified form of my invention. Fig. 4 is a partial transverse sectional view taken on the plane indicated by the line $a$ $a$ of Fig. 1.

In the form of my invention shown in Figs. 1 and 2 I provide a suitable supporting-frame 1, in which, near the upper side and near the ends thereof, are mounted a pair of rollers 2 3. The shaft $3^a$ of the roller 3 is disposed in movable bearings 4. Screws 5 are provided to adjust the said bearings, and hence adjust said roller toward or from the roller 2. The said rollers 2 3 are connected together by an endless belt 6, which is adapted to travel, as will be understood, when the said rollers are rotated. The tension of the said belt may be regulated by adjusting the roller 3. For the purposes of illustration I show the shaft $2^a$ of the roller 2 provided at one end with a power-pulley 7 and at the opposite end with a pulley 8, which is shown in dotted lines in Figs. 1 and 2. A roller 9 is mounted in adjustable bearings 10 on the upper side of the frame, and said roller is faced with rubber or other suitable material, as at 11, and bears against the upper lead of the belt 6. Adjusting-screws 12 are provided to move the said roller 9 toward or from the roller 2. I here show the shaft of said roller 9 provided at one end with a pulley 13 and at the opposite end with a pulley 14, the latter pulley being indicated in dotted lines. A belt 15 connects the pulleys 8 and 14. It will be observed that the pulleys 8 14 are of different diameters, and hence it will be understood that the roller 9 travels at a different rate of speed from that of the belt 6, on which it impinges. At the feed end of the frame and on the latter is a hopper 16. A screen 17 is disposed under the said hopper, the latter discharging onto said screen, and a feed-shoe 18 is disposed under the said screen and feeds the beans which fall through the said screen onto the belt 6, thereby subjecting the beans to the action of the said belt and the roller 9. Owing to the difference in the respective rates of speed of the said belt and the said roller the beans are subjected to a certain attrition which prevents the beans from adhering to the roller and is effective in rubbing the earthy particles and other impurities from the surfaces of the beans and in pulverizing the said earthy particles, so that the same and the other impurities may be readily separated from the beans. The frame 1 is incased, as shown in Figs. 1 and 2, and the space between the side walls of the casing is practically coextensive in width with that of the belt 6, so that the sides of the belt are so close to those of the side walls of the casing that beans are prevented from leaving the belt until after they reach the roller 3. Below the belt 6 is a shaking-screen 19, onto which the said belt discharges. The said screen has comparatively fine meshes, as at 20, at the portion thereof onto which the beans, together with the pulverized impurities, are fed. The other portion of the said screen has meshes of sufficient size to allow the beans to pass between them, as at 21. Within the scope of my invention any suitable means may be employed for shaking the said screen. For the purposes of this specification I show a shaft 22, having a crank 23 connected to the said screen by a pitman 24. Said shaft 22 has a pulley 25, which is connected by a belt 26 to the pulley 13 on the shaft of the roller 9. The said shaft 22 is also shown as provided with a pulley 27, which is indicated in dotted lines and is for the purpose of driving an exhaust-fan 28, the latter having a pulley 29 connected to the said pulley 27 by an endless belt 30. The earthy particles and other impurities are sifted from the beans by the finer-meshed portion 20 of the screen 19, the said impurities falling into a hopper 31, which is provided with a discharge-spout 32. The beans fall through the more coarselymeshed portion 21 of the said screen into a hopper 33 and pass therefrom through a spout 34. The casing 35 of the exhaust-fan 28 communicates with the upper end of a winnowing-trunk 36, which leads from the discharge-spout 34. A pocket 37 is on the lower side of the said winnowing-trunk and at its lower end has a discharge-opening 38, which is normally closed by a valve 39 owing to the exhaust action of the fan. A baffle 40 extends from the upper side of the winnowing-trunk 36 downwardly a suitable distance into the pocket 37. A suitable discharge-spout 41 leads from the fan-casing. In the operation of this form of my invention the exhaust-current of air which passes through the trunk 36, owing to the action of the fan 28, subjects the beans as they drop through the spout 34 to the action of an ascending current of air, which carries off the lighter impurities and causes the same to be deposited in the lower portion of the pocket 37. When the impurities in the said pocket accumulate to such an extent that their weight more than counteracts the effect of the partial vacuum maintained in the winnowing-trunk by the exhaust-fan, the valve 39 automatically opens to permit the discharge of the said impurities and is immediately thereafter closed by the effect of the said partial vacuum, as will be understood.

In the modified form of my invention shown in Fig. 3 the belt 6 is disposed nearly perpendicularly. The operation of the endless traveling belt 6 and the roller 9 is the same as in the form of my invention shown in Fig. 1.

I do not desire to limit myself to either of the forms of my invention here shown and described, as it is evident that other modifications may be made therein without departing from the spirit of my invention.

The endless belt 6 may be made of rubber, metal, or of any other suitable material and may be of any suitable construction.

While I have herein shown only one roll 9 operating in connection with the endless belt 6, I would have it understood that two or more of said rolls 9 may be employed in this connection to successively act upon the beans or other material, thus subjecting the same to a series of partial reductions.

While I have here shown and described my invention as adapted for use in cleaning beans, the same may be also used for cleaning grain of various kinds and for grinding purposes, and I do not desire to limit myself in this particular.

Having thus described my invention, I claim—

1. In a machine of the class described, the combination of an endless traveling belt and a roller engaging and driven at a surface speed different from that of the belt, said roller having a resilient friction-surface, whereby the beans are prevented from adhering to the roller and their surfaces are subjected to attrition which pulverizes and dislodges the impurities from the surfaces of the beans, without breaking the latter, substantially as described.

2. The combination of an endless traveling belt, a roller engaging the belt, means to drive the belt and roller at different rates of speed, said roller having a resilient friction-surface, whereby the beans are prevented from adhering to the roller and their surfaces are subjected to attrition which pulverizes and dislodges the impurities from the surfaces of the beans without breaking the latter, a screen onto which the beans are discharged from the traveling belt, said screen having a section to sift the pulverized impurities from the beans and a section through which the beans drop, and means to winnow the beans, substantially as described.

In testimony that I claim the foregoing as my own I have hereto affixed my signature in the presence of two witnesses.

GEORGE R. DAVIDSON.

Witnesses:
ARTHUR H. HUNVICK,
E. H. ROWLEY.